(12) United States Patent
Wu et al.

(10) Patent No.: US 11,463,305 B2
(45) Date of Patent: Oct. 4, 2022

(54) METHOD AND APPARATUS FOR CONFIGURING NETWORK DEVICE, AND STORAGE MEDIUM

(71) Applicant: HUAWEI TECHNOLOGIES CO., LTD., Guangdong (CN)

(72) Inventors: Ping Wu, Beijing (CN); Donghui Wang, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/100,364

(22) Filed: Nov. 20, 2020

(65) Prior Publication Data

US 2021/0075672 A1   Mar. 11, 2021

Related U.S. Application Data

(63) Continuation of application No. PCT/CN2018/087662, filed on May 21, 2018.

(51) Int. Cl.
*H04L 41/16* (2022.01)
*H04L 41/0806* (2022.01)
*H04L 41/0893* (2022.01)

(52) U.S. Cl.
CPC ...... *H04L 41/0806* (2013.01); *H04L 41/0893* (2013.01); *H04L 41/16* (2013.01)

(58) Field of Classification Search
CPC .. H04L 41/0808; H04L 41/0893; H04L 41/16
See application file for complete search history.

(56) References Cited

U.S. PATENT DOCUMENTS

| 6,522,628 | B1 * | 2/2003 | Patel | H04W 72/1252 370/230.1 |
| 9,019,121 | B1 | 4/2015 | Duff et al. | |
| 10,341,174 | B2 * | 7/2019 | He | H04W 24/08 |

(Continued)

FOREIGN PATENT DOCUMENTS

| CN | 101540958 A | 9/2009 |
| CN | 102170641 A | 8/2011 |

(Continued)

*Primary Examiner* — Viet D Vu
(74) *Attorney, Agent, or Firm* — Womble Bond Dickinson (US) LLP

(57) ABSTRACT

This application discloses a method and an apparatus for configuring a network device, and a storage medium, and belongs to the field of data transmission technologies. The method includes: determining, in a plurality of terminal groups based on a packet receiving and sending characteristic of a target terminal, a target terminal group to which the target terminal belongs, where the packet receiving and sending characteristic is determined based on a plurality of packets received and sent by the target terminal, and the plurality of terminal groups are in a one-to-one correspondence with a plurality of configurations; and configuring a to-be-configured network device based on a target configuration corresponding to the target terminal group, where the to-be-configured network device is a network device that forwards the plurality of packets. This application effectively reduces workload in a configuration process. This application is used to configure the network device.

18 Claims, 9 Drawing Sheets

(56) References Cited

U.S. PATENT DOCUMENTS

| | | | |
|---|---|---|---|
| 10,419,282 B1* | 9/2019 | Cosgrove | H04L 41/0886 |
| 2004/0052260 A1* | 3/2004 | Tabu | H04L 45/00 |
| | | | 370/392 |
| 2006/0184998 A1* | 8/2006 | Smith | H04L 41/0856 |
| | | | 726/3 |
| 2006/0274774 A1 | 12/2006 | Srinivasan et al. | |
| 2015/0081859 A1* | 3/2015 | Xu | H04L 41/0886 |
| | | | 709/222 |
| 2015/0280992 A1* | 10/2015 | Wang | H04L 41/0806 |
| | | | 370/254 |
| 2015/0351110 A1* | 12/2015 | Bai | H04L 47/283 |
| | | | 370/329 |
| 2016/0254963 A1 | 9/2016 | Vibhor et al. | |
| 2018/0262430 A1* | 9/2018 | Testicioglu | H04L 43/0888 |
| 2019/0044869 A1* | 2/2019 | Wang | H04L 45/586 |

FOREIGN PATENT DOCUMENTS

| | | | |
|---|---|---|---|
| CN | 103079272 A | 5/2013 | |
| CN | 105471609 A | 4/2016 | |
| CN | 107124312 A | 9/2017 | |
| JP | 2014514887 A | 6/2014 | |
| JP | 2014219741 A | 11/2014 | |
| WO | 02080458 A1 | 10/2002 | |
| WO | 2015194604 A1 | 12/2015 | |

* cited by examiner

| | | | | | |
|---|---|---|---|---|---|
| 46924 | 176.235472 | HuaweiTe_9d:65:04 | ZebraTec_f2:81:ea | 802.11 | 126 QoS Data, SN=3772, FN=6, Flags=p.....F.. |
| 46947 | 176.335738 | ZebraTec_f2:81:ea | ExtremeN_12:89:41 | 802.11 | 60 Null function (No data), SN=1221, FN=0, Flags=...P...TC |
| 47367 | 177.807672 | HuaweiTe_9d:65:04 | ZebraTec_f2:81:ea | 802.11 | 126 QoS Data, SN=2612, FN=0, Flags=.p....F.. |
| 47375 | 177.810864 | HuaweiTe_9d:65:04 | ZebraTec_f2:81:ea | 802.11 | 126 QoS Data, SN=2613, FN=0, Flags=.p...F.C |
| 47378 | 177.811136 | HuaweiTe_9d:65:04 | ZebraTec_f2:81:ea | 802.11 | 126 QoS Data, SN=2614, FN=0, Flags=.p....F.. |
| 47401 | 177.854671 | d9:58:39:9d:65:04 | ZebraTec_f2:81:ea | 802.11 | 138 QoS Data, SN=2618, FN=0, Flags=.p....F.. |
| 47410 | 177.865130 | HuaweiTe_9d:65:04 | ZebraTec_f2:81:ea | 802.11 | 126 QoS Data, SN=2619, FN=0, Flags=.p....F.. |
| 47413 | 177.865399 | HuaweiTe_9d:65:04 | ZebraTec_f2:81:ea | 802.11 | 126 QoS Data, SN=2620, FN=0, Flags=.p....F.. |
| 47435 | 177.903779 | 80:d3:39:9d:65:04 | ZebraTec_f2:81:ea | 802.11 | 1586 QoS Data, SN=2629, FN=0, Flags=.p.R.F.. |
| 47439 | 177.904663 | HuaweiTe_9d:65:04 | ZebraTec_f2:81:ea | 802.11 | 1586 QoS Data, SN=2631, FN=0, Flags=.p....F.. |
| 47445 | 177.905938 | HuaweiTe_9d:65:04 | ZebraTec_f2:81:ea | 802.11 | 273 QoS Data, SN=2634, FN=0, Flags=.p....F.. |
| 47505 | 178.091826 | HuaweiTe_9d:65:04 | ZebraTec_f2:81:ea | 802.11 | 126 QoS Data, SN=2635, FN=0, Flags=.p...F.C |
| 47532 | 178.193543 | ZebraTec_f2:81:ea | ExtremeN_12:89:41 | 802.11 | 60 Null function (No data), SN=1222, FN=0, Flags=....P...TC |
| 47747 | 179.494347 | 07:85:08:ba:51:04 | ZebraTec_f2:81:ea | 802.11 | 138 QoS Data, SN=2636, FN=0, Flags=.p.R.F.. |
| 47752 | 179.499156 | HuaweiTe_9d:65:04 | ZebraTec_f2:81:ea | 802.11 | 126 QoS Data, SN=2637, FN=0, Flags=.p....F.. |

FIG. 10

| | | | | | |
|---|---|---|---|---|---|
| 1944 | 7.282580 | 4e:d5:39:9d:65:06 | ZebraTec_ca:9a:73 | 802.11 | 126 QOS Data, SN=978, FN=0, Flags=.p.R..F.. |
| 1946 | 7.282778 | HuaweiTe_9d:65:06 | ZebraTec_ca:9a:73 | 802.11 | 126 QOS Data, SN=978, FN=0, Flags=.p.R..F.. |
| 1958 | 7.383305 | ZebraTec_ca:9a:73 | ExtremeN_12:89:41 | 802.11 | 60 Null function (No data), SN=4091, FN=0, Flags=....P...TC |
| 1986 | 7.554125 | HuaweiTe_9d:65:06 | ZebraTec_ca:9a:73 | 802.11 | 138 QoS Data, SN=979, FN=0, Flags=.p.....F.C |
| 2026 | 7.806807 | bb:6e:bf:a4:37:df | ZebraTec_ca:9a:73 | 802.11 | 126 QoS Data, SN=763, FN=5, Flags=.p.....F.. |
| 2029 | 7.807651 | HuaweiTe_9d:65:06 | ZebraTec_ca:9a:73 | 802.11 | 138 QoS Data, SN=985, FN=0, Flags=.p.....F.. |
| 2037 | 7.834957 | 6f:4d:ea:92:65:06 | ZebraTec_ca:9a:73 | 802.11 | 1586 QoS Data, SN=987, FN=0, Flags=.p.....F.. |
| 2281 | 9.074826 | ZebraTec_ca:9a:73 | ExtremeN_12:89:41 | 802.11 | 60 Null function (No data), SN=1, FN=0, Flags=...P...TC |
| 2440 | 9.379384 | HuaweiTe_9d:65:06 | ZebraTec_ca:9a:73 | 802.11 | 1586 QoS Data, SN=1005, FN=0, Flags=.p.R..F.. |
| 2442 | 9.379825 | 4f:0c:5c:3a:68:06 | ZebraTec_ca:9a:73 | 802.11 | 1586 QoS Data, SN=1005, FN=0, Flags=.p.R..F.. |

FIG. 11

| | | | | | |
|---|---|---|---|---|---|
| 4866 30.104583 | Oneplusl_88:1c:7b | HuaweiTe_9d:65:0e | 802.11 | 138 | QoS Data, SN=2190, FN=0, Flags=.p....TC |
| 4883 30.137188 | HuaweiTe_9d:65:0e | OneplusT_88:1c:7b | 802.11 | 138 | QoS Data, SN=1674, FN=0, Flags=.p...F.C |
| 4909 30.283453 | OneplusT_88:1c:7b | ZebraTec_df:ce:44 | 802.11 | 62 | QoS Null function (No data), SN=735, FN=0, Flags=...P...TC |
| 8918 60.303349 | OneplusT_88:1c:7b | ZebraTec_df:ce:44 | 802.11 | 114 | QoS Data, SN=2191, FN=0, Flags=.p.P..TC |
| 8920 60.305500 | OneplusT_88:1c:7b | ZebraTec_df:ce:44 | 802.11 | 63 | Action, SN=736, FN=0. Flags=...P...C |
| 9683 64.848634 | OneplusT_88:1c:7b | ZebraTec_df:ce:44 | 802.11 | 63 | Action, SN=737, FN=0. Flags=........C |
| 9685 64.848989 | OneplusT_88:1c:7b | ZebraTec_df:ce:44 | 802.11 | 62 | QoS Null function (No data), SN=738, FN=0, Flags=........TC |
| 9718 65.049371 | OneplusT_88:1c:7b | ZebraTec_df:ce:44 | 802.11 | 62 | QoS Null function (No data), SN=739, FN=0, Flags=...P...TC |
| 14652 95.075085 | OneplusT_88:1c:7b | ZebraTec_df:ce:44 | 802.11 | 114 | QoS Data, SN=2192, FN=0, Flags=.p.P...TC |
| 14657 95.092173 | OneplusT_88:1c:7b | ZebraTec_df:ce:44 | 802.11 | 63 | Action, SN=740, FN=0. Flags=...P...C |
| 17895 113.360170 | OneplusT_88:1c:7b | ZebraTec_df:ce:44 | 802.11 | 63 | Action, SN=741, FN=0. Flags=........C |
| 17897 113.360355 | OneplusT_88:1c:7b | ZebraTec_df:ce:44 | 802.11 | 62 | QoS Null function (No data), SN=742, FN=0, Flags=........TC |
| 17904 113.411630 | OneplusT_88:1c:7b | HuaweiTe_9d:65:0e | 802.11 | 127 | QoS Data, SN=2193, FN=0, Flags=.p....TC |
| 17905 113.411954 | OneplusT_88:1c:7b | HuaweiTe_9d:65:0e | 802.11 | 127 | QoS Data, SN=2193, FN=0, Flags=.p.R.TC |

FIG. 12

METHOD AND APPARATUS FOR CONFIGURING NETWORK DEVICE, AND STORAGE MEDIUM

CROSS-REFERENCE TO RELATED APPLICATIONS

This application is a continuation of International Application No. PCT/CN2018/087662, filed on May 21, 2018, the disclosure of which is hereby incorporated by reference in its entirety.

TECHNICAL FIELD

The present disclosure relates to the field of data transmission technologies, and in particular, to a method and an apparatus for configuring a network device, and a storage medium.

BACKGROUND

Based on requirements of network planning and network security, when different types of terminals are connected to device interfaces of a network device, different configurations need to be performed on the device interfaces of the network device, to execute a corresponding network policy. For example, based on the requirements of the network planning such as virtual local area network (VLAN) planning and Internet Protocol (IP) address planning, and the requirements of the network security such as network authentication, authorization, accounting (AAA), parameters of the device interfaces connected to different types of terminals may be configured, and the parameters may include a transmission rate limit, a transmission priority, an access control list (ACL), a VLAN identity (ID) added for a packet through the device interfaces, and the like.

When a device interface of a network device is configured, a target configuration of the device interface usually needs to be determined manually based on a terminal connected to the network device, and the device interface is configured based on the target configuration. When there is a large quantity of to-be-configured network devices, the configuration process has a large workload.

SUMMARY

This application provides a method and an apparatus for configuring a network device, and a storage medium, to resolve a problem of large workload in a configuration process. Technical solutions provided in this application are as follows.

According to a first aspect, this application provides a method for configuring a network device, including: determining, in a plurality of terminal groups based on a packet receiving and sending characteristic of a target terminal, a target terminal group to which the target terminal belongs, where the packet receiving and sending characteristic is determined based on a plurality of packets received and sent by the target terminal, and the plurality of terminal groups are in a one-to-one correspondence with a plurality of configurations; and configuring a to-be-configured network device based on a target configuration corresponding to the target terminal group, where the to-be-configured network device is a network device that forwards the plurality of packets.

According to the method for configuring the network device provided in this application, the target terminal is classified based on the packet receiving and sending characteristic reflecting a packet receiving and sending situation of the target terminal, and the to-be-configured network device is configured based on a classification result. Compared with an implementation in which the network device is configured manually, the target configuration of the target terminal can be determined based on the packet receiving and sending characteristic of the target terminal without manually determining the target configuration of the network device based on the target terminal, thereby effectively reducing workload in the configuration process.

Because the packet receiving and sending characteristic is a characteristic obtained after the plurality of packets received and sent by the target terminal are analyzed, the packet receiving and sending characteristic reflects a correlation between the plurality of packets. Compared with an inherent characteristic such as a MAC address of a terminal, because the inherent characteristic such as the MAC address is usually used to reflect information such as a terminal manufacturer, and the like, a classification standard of dividing terminal types based on the inherent characteristic is relatively rough. However, the packet receiving and sending characteristic can reflect a packet receiving and sending situation of the target terminal. When the terminal types are divided based on the packet receiving and sending characteristic, the classification standard of dividing the terminal types is refined. When the target terminal group to which the target terminal belongs is determined in the plurality of terminal groups based on the packet receiving and sending characteristic, accuracy of determining the target terminal group can be improved, and accuracy of configuring the network device is further improved.

In one embodiment, the packet receiving and sending characteristic includes sort of the plurality of packets.

In one embodiment, the packet receiving and sending characteristic further includes the following one or more: a packet transmission time interval between two packets in the plurality of packets, sort of packet types of the plurality of packets, and sort of packet sizes of the plurality of packets.

Further, the packet receiving and sending characteristic may also include one or a combination of more characteristics: sort of source ports corresponding to the plurality of packets, sort of destination ports corresponding to the plurality of packets, a MAC address and an IP address that are of a packet transmit end, a MAC address and an IP address that are of a packet receive end, source port numbers and destination port numbers that are of packets, a DSCP value carried in received and sent packets, and the like.

In one embodiment, the method further includes: obtaining packet receiving and sending characteristics of a plurality of sample terminals; and training, based on the packet receiving and sending characteristics of the plurality of sample terminals, a group module by using a machine learning method, to obtain a trained group module.

The process is a process of training the grouping model based on a training sample. When the target configuration corresponding to the target terminal is determined, the process does not need to be performed each time. That is, when the target configuration corresponding to the target terminal is determined, the target terminal group corresponding to the target terminal may be determined by directly using the trained grouping model.

In one embodiment, the determining, in a plurality of terminal groups based on a packet receiving and sending characteristic of a target terminal, a target terminal group to which the target terminal belongs includes: separately determining, in the plurality of terminal groups based on the trained grouping model and the packet receiving and sending characteristic, a score of a possibility that the target terminal belongs to each terminal group, where the grouping model is used to separately determine, based on an input packet receiving and sending characteristic, the score of the possibility that the target terminal belongs to each terminal group, and the score corresponding to each terminal group is used to represent a possibility that the target terminal belongs to a corresponding terminal group; determining a highest score in the scores of the possibilities that the target terminal belongs to the terminal groups; and determining that a terminal group corresponding to the highest score is the target terminal group.

A higher score of the possibility that the target terminal belongs to a terminal group indicates a higher similarity between a type of the target terminal and a type of the corresponding terminal group. Therefore, the highest score may be determined in the scores of the possibilities that the target terminal belongs to the terminal groups, and the terminal group corresponding to the highest score may be determined as a target terminal group.

According to a second aspect, this application provides an apparatus for configuring a network device, including: a determining module, configured to determine, in a plurality of terminal groups based on a packet receiving and sending characteristic of a test terminal, a target terminal group to which the test terminal belongs, where the packet receiving and sending characteristic is determined based on a plurality of packets received and sent by the test terminal, and the plurality of terminal groups are in a one-to-one correspondence with a plurality of configurations; and a configuration module, configured to configure a to-be-configured network device based on a target configuration corresponding to the target terminal group, where the to-be-configured network device is a network device that forwards the plurality of packets.

In one embodiment, the packet receiving and sending characteristic includes sort of the plurality of packets.

In one embodiment, the packet receiving and sending characteristic further includes the following one or more: a packet transmission time interval between two packets in the plurality of packets, sort of packet types of the plurality of packets, and sort of packet sizes of the plurality of packets.

In one embodiment, the apparatus further includes: an obtaining module, configured to obtain packet receiving and sending characteristics of a plurality of sample terminals; and a training module, configured to train, based on the packet receiving and sending characteristics of the plurality of sample terminals, a grouping module by using a machine learning method, to obtain a trained group module.

In one embodiment, the determining module is configured to: separately determine, in the plurality of terminal groups based on the trained grouping model and the packet receiving and sending characteristic, a score of a possibility that the test terminal belongs to each terminal group, where the grouping model is used to separately determine, based on an input packet receiving and sending characteristic, the score of the possibility that the target terminal belongs to each terminal group, and the score corresponding to each terminal group is used to represent a possibility that the target terminal belongs to a corresponding terminal group; determine a highest score in the scores of the possibilities that the test terminal belongs to the terminal groups; and determine that a terminal group corresponding to the highest score is the target terminal group.

According to a third aspect, this application provides an apparatus for configuring a network device, where the apparatus for configuring the network device includes: a processor; and a memory, configured to store an executable instruction of the processor, where the processor is configured to: determine, in a plurality of terminal groups based on a packet receiving and sending characteristic of a target terminal, a target terminal group to which the target terminal belongs, where the packet receiving and sending characteristic is determined based on a plurality of packets received and sent by the target terminal, and the plurality of terminal groups are in a one-to-one correspondence with a plurality of configurations; and configure a to-be-configured network device based on a target configuration corresponding to the target terminal group, where the to-be-configured network device is a network device that forwards the plurality of packets.

According to a fourth aspect, this application provides a storage medium, where when an instruction in the storage medium is executed by a processor of a terminal, the terminal is enabled to perform the method for configuring the network device according to any embodiment of the first aspect.

BRIEF DESCRIPTION OF DRAWINGS

FIG. 10 is a schematic diagram of a packet receiving and sending situation of a terminal A according to this application;

FIG. 11 is a schematic diagram of a packet receiving and sending situation of a terminal B according to this application;

FIG. 12 is a schematic diagram of a packet receiving and sending situation of a terminal C according to this application;

DESCRIPTION OF EMBODIMENTS

Embodiments of the present disclosure provide a method for configuring a network device. There may be a plurality of scenarios in the method for configuring the network device. For example, in a first embodiment, the scenario may include a terminal and a network device, or, in a second embodiment, the scenario may include a terminal, a network device, and a controller device. The following separately describes the two scenarios.

Figure 1:
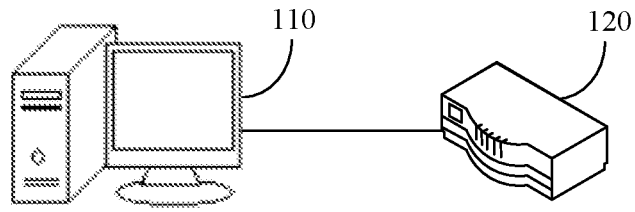
FIG. 1 is a schematic diagram of a scenario in a method for configuring a network device according to this application.

FIG. 1 is a schematic diagram of a first scenario in the method for configuring the network device. As shown in FIG. 1, the scenario may include: a terminal 110 and a network device 120, where the network device 120 may be a network device 120 (namely, a to-be-configured network device) on which a configuration operation is to be performed.

The terminal 110 may access a network through the network device 120. Packets received and sent by the terminal 110 are forwarded by the network device 120. For example, the terminal 110 may be a printer, a set-top box, a camera, an IP phone, a sensor (for example, a temperature sensor, a humidity sensor, a light sensor, and the like), a smartphone, a computer, a multimedia player, an electronic book reader, a wearable device, or the like. The network device 120 may be a switch, a router, a wireless access point (WAP), or the like.

The network device 120 may obtain the packets received and sent by the terminal 110, determine a type of the terminal 110 based on the packets received and sent by the terminal 110, and further configure the network device 120 based on the type of the terminal 110. When the network device is configured, a global setting of the network device may be configured, to perform, based on a configured network device, a specified processing operation on all packets forwarded by the network device. Alternatively, a local setting of the network device may be configured, to perform, based on a local setting of a configured network device, a specified processing operation on some of packets forwarded by the network device. For example, a device interface of the network device 120 may be configured. The network device 120 may obtain a packet sent by the terminal 110 within preset duration after the terminal 110 accesses a network, determine a type of the terminal based on the packet, and determine a target configuration corresponding to the terminal 110 based on the type of the terminal 110, so that a parameter of the device interface is configured based on the target configuration.

Figure 2:
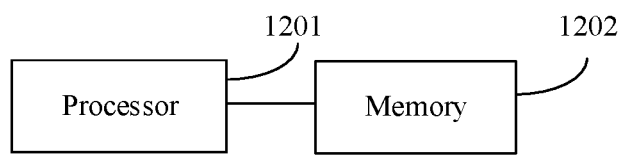
FIG. 2 is a schematic structural diagram of a network device according to this application.

The network device may have functions of data processing, data storage, and packet forwarding. In one embodiment, the functions of data processing, data storage, and packet forwarding may be implemented by using any one of components such as a processor, a forwarding chip, and the like. Alternatively, the functions of data processing, data storage, and packet forwarding may be respectively implemented by using a plurality of components. For example, referring to FIG. 2, the network device 120 may include a processor 1201 and a memory 1202. The memory 1202 is configured to store data required by the processor 1201 for calculation and other data.

Figure 3:
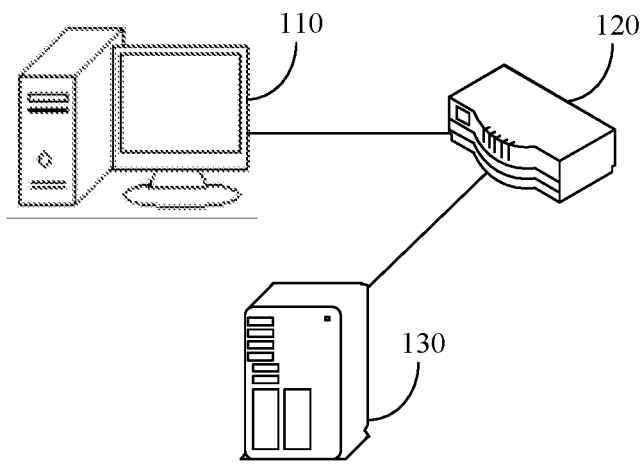
FIG. 3 is a schematic diagram of a scenario in another method for configuring a network device according to this application.

FIG. 3 is a schematic diagram of a second scenario in the method for configuring the network device. As shown in FIG. 3, the scenario may include a terminal 110, a network device 120, and a controller device 130. The terminal 110 may access a network through the network device 120, the network device 120 may be connected to the controller device 130 through a wired or wireless network, and packets received and sent by the terminal 110 are forwarded by the network device 120.

The terminal in FIG. 3 has the same function as the terminal in FIG. 1. The network device 120 may send, to the controller device 130 based on the packets received and sent by the terminal, a packet receiving and sending characteristic reflecting a packet receiving and sending situation of the target terminal. The controller device 130 may determine a type of the terminal 110 based on the packet receiving and sending characteristic, determine, based on the type of the terminal 110, a target configuration for configuring the network device 120, and send the target configuration to the network device 120, so that the network device 120 performs a configuration operation based on the target configuration. In one embodiment, a function of the controller device 130 may be implemented through a computer program that runs in at least one server or switch.

Figure 4:
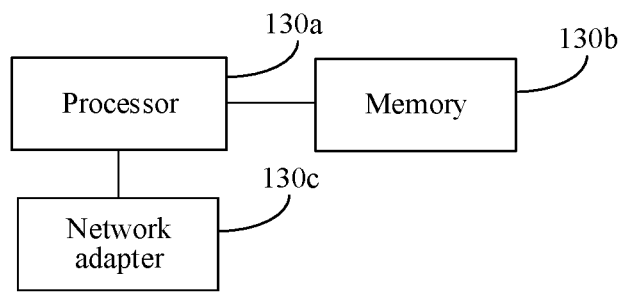
FIG. 4 is a schematic structural diagram of a server according to this application.

When the function of the controller device 130 is implemented through the computer program that runs in a server, the server may have functions of data processing, data storage, and communication with other devices. In one embodiment, the functions of data processing and data storage may be implemented by using any component of a processor and a memory. Alternatively, the functions of data processing, data storage, and packet forwarding may be respectively implemented by using a plurality of components. For example, referring to FIG. 4, the server may include a processor 130a, a memory 130b, and a network adapter 130c. The processor 130a is configured to process data, for example, the processor 130a is responsible for protocol calculation, device status maintenance, and the like. The memory 130b is configured to store data required by the processor 130a for calculation and other data. The network adapter 130c is configured to communicate with other devices.

The foregoing processor may be a general-purpose processor, for example, a central processing unit (CPU), a forwarding chip, or a combination of the CPU and the forwarding chip. Alternatively, the foregoing processor may be a hardware chip, and the hardware chip may be an application-specific integrated circuit (ASIC), a programmable logic device (PLD), or a combination thereof. The foregoing PLD may be a complex programmable logic device ( ), a field-programmable gate array (FPGA), generic array logic (GAL), or any combination thereof. The foregoing forwarding chip may include a network processor (NP), an FPGA or an ASIC. The NP, FPGA, or ASIC has a function of packet forwarding.

The foregoing memory may include a volatile memory, for example, a random access memory (RAM); or, the foregoing memory may further include a non-volatile memory, for example, a flash memory, a hard disk drive (HDD), a solid-state drive (SSD), or the like. Alternatively, the foregoing memory may further include a combination of the foregoing types of memories.

Figure 5:
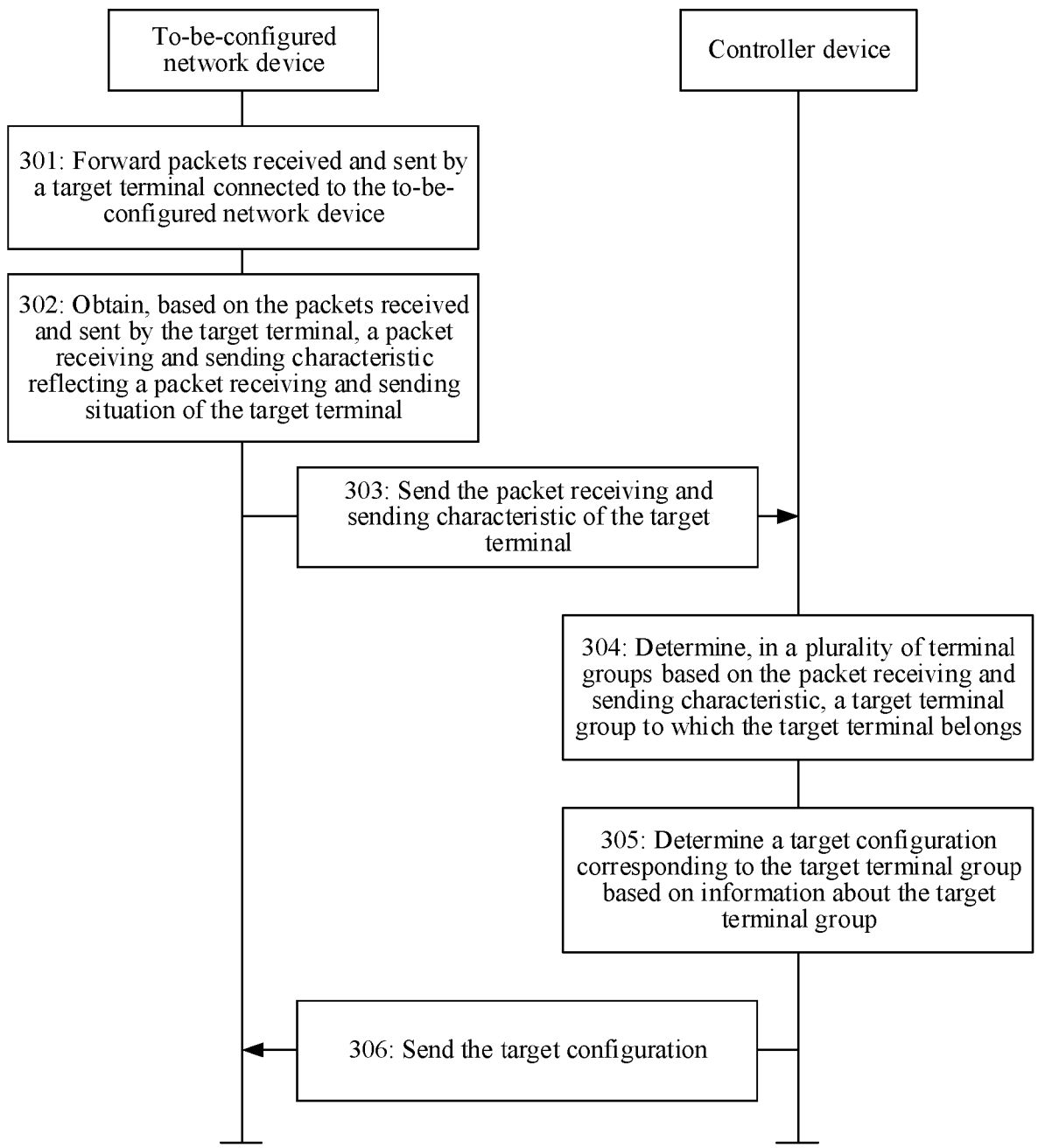
FIG. 5 is a flowchart of a method for configuring a network device according to this application.

An embodiment of the present disclosure provides a method for configuring a network device. The method for configuring the network device may be applied to the scenario shown in FIG. 1 or FIG. 3. As shown in FIG. 5, the method for configuring the network device may include the following operations.

Operation 301: A to-be-configured network device forwards packets received and sent by a target terminal connected to the to-be-configured network device.

Before a target configuration of the to-be-configured network device is determined, the target terminal may be connected to the to-be-configured network device by default, and the to-be-configured network device may forward, based on a default configuration, the packets that need to be received and sent by the target terminal.

Operation 302: The to-be-configured network device obtains, based on the packets received and sent by the target terminal, a packet receiving and sending characteristic reflecting a packet receiving and sending situation of the target terminal.

After forwarding, for the target terminal, the packets that need to be received and sent, the to-be-configured network device may obtain, based on the packets received and sent by the target terminal, the packet receiving and sending characteristic reflecting the packet receiving and sending situation of the target terminal. The packet receiving and sending characteristic may include sort of a plurality of packets. In one embodiment, the packet receiving and sending characteristic may further include the following one or more: sort of packet sizes of a plurality of packets, sort of packet types of a plurality of packets, a packet transmission time interval between two packets in a plurality of packets, and the like.

The sort of the plurality of packets may be sort of original content of the plurality of packets. For example, original content of packets may be data represented by using a plurality of binary values. Correspondingly, the sort of the plurality of packets may be data represented by using multi-segment binary values, and each segment of binary values is used to represent original content of one packet. Alternatively, the sort of the plurality packets may be sort of packet digests of the plurality of packets. The packet digests are obtained based on the original content of the packets. The packet digests may be values of fields in a packet header and/or a payload of the packet, for example, a media access control (MAC) address and an IP address that are of a packet transmit end, a MAC address and an IP address that are of a packet receive end, a source port number and a destination port number that are of a packet, a differentiated services code point (DSCP) value carried in received and sent packets, values of fields of a domain name server (DNS) request packet, and values of fields of a dynamic host configuration protocol (DHCP) request packet.

When the packet receiving and sending characteristic includes the packet transmission time interval between two packets in the plurality of packets, the two packets may be two adjacent packets in time sequence, or, the two packets may be any two packets in the plurality of packets. For example, assuming that the plurality of packets include a packet 1, a packet 2, a packet 3, and a packet 4 that are arranged in time sequence, the packet receiving and sending characteristic may include: a packet transmission time interval between the packet 1 and the packet 2, a packet transmission time interval between the packet 2 and the packet 3, and a packet transmission time interval between the packet 3 and the packet 4; or, the packet receiving and sending characteristic may include: a packet transmission time interval between the packet 1 and the packet 2, a packet transmission time interval between the packet 1 and the packet 3, and a packet transmission time interval between the packet 1 and the packet 4.

Operation 303: The to-be-configured network device sends the packet receiving and sending characteristic of the target terminal to a controller device.

In one embodiment, the to-be-configured network device may send the packet receiving and sending characteristic to the controller device in a form of a packet. For example, after obtaining the packet receiving and sending characteristic, the to-be-configured network device may encapsulate the packet receiving and sending characteristic in a control protocol packet, and sends the control protocol packet to the controller device through a forwarding chip in the to-be-configured network device.

Compared with an implementation of sending original content of received and sent packets to the controller device, in an implementation in which the to-be-configured network device sends the packet receiving and sending characteristic obtained based on the original content to the controller device, because not all packet content needs to be sent, a volume of sent data can be reduced, and efficiency of sending data is further improved.

When the method for configuring the network device provided in this embodiment of the present disclosure is applied to the scenario shown in FIG. 1, after obtaining the packet receiving and sending characteristic, the to-be-configured network device may determine, based on the packet receiving and sending characteristic, a terminal group to which the target terminal belongs, that is, operation 304 is directly performed after operation 302 is performed. Correspondingly, when the configuration method is applied to the scenario shown in FIG. 1, operations performed by the controller device in the following operation 304 to operation 306 are all performed by the to-be-configured network device, and for an implementation process of performing a specific operation by the to-be-configured network device, refer to an implementation process of performing a corresponding operation by the controller device.

In one embodiment, the network device that forwards the packet for the target terminal in operation 301 to operation 303 is not limited to the to-be-configured network device, and may further be another network device that directly or indirectly forwards the packets received and sent by the target terminal. For example, the network device in operation 302 may alternatively be another network device connected to the target terminal connected to the to-be-configured network device.

Operation 304: The controller device determines, in a plurality of terminal groups based on the packet receiving and sending characteristic, a target terminal group to which the target terminal belongs.

Figure 6:
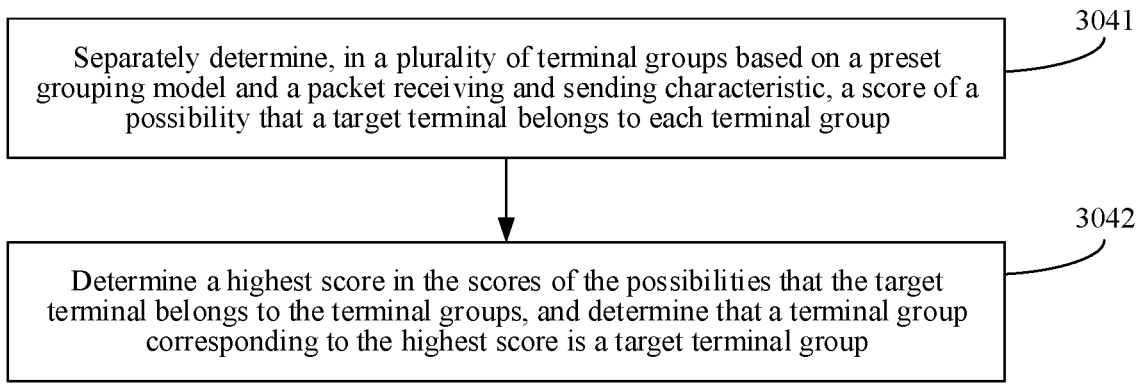
FIG. 6 is a flowchart of a method for determining, in a plurality of terminal groups, a target terminal group to which a target terminal belongs according to this application.

In one embodiment, referring to FIG. 6, an implementation of the operation 304 may include the following operations.

Operation 3041: Separately determine, in a plurality of terminal groups based on a preset grouping model and a packet receiving and sending characteristic, a score of a possibility that the target terminal belongs to each terminal group.

In one embodiment, the preset grouping model may be a grouping model that completes training in advance. After a training process of the grouping model is completed, a mapping relationship between an input and an output that are of the trained grouping model can be determined, and group information obtained after the trained grouping model groups a training sample may be determined. After the packet receiving and sending characteristic of the target terminal is input into the trained grouping model, the trained grouping model may determine, based on the mapping relationship, a score of a possibility that the target terminal belongs to each terminal group in the plurality of terminal groups indicated by the group information, that is, determine a possibility that the target terminal belongs to each terminal group.

Operation 3042: Determine a highest score in the scores of the possibilities that the target terminal belongs to the terminal groups, and determine that a terminal group corresponding to the highest score is a target terminal group.

A higher score of the possibility that the target terminal belongs to a terminal group indicates a higher similarity between a type of the target terminal and a type of the corresponding terminal group. Therefore, the highest score may be determined in the scores of the possibilities that the target terminal belongs to the terminal groups, and the terminal group corresponding to the highest score may be determined as the target terminal group.

For example, assuming that group information output by the trained grouping model instructs to divide a plurality of sample terminals into three terminal groups, the three terminal groups are respectively a terminal group 1, a terminal group 2, and a terminal group 3, and after the packet receiving and sending characteristic of the target terminal is input into the trained grouping model, the trained grouping model determines that scores of possibilities that the target terminal belongs to the three terminal groups are respectively: 190, 56, and 10, the terminal 1 can be determined as the target terminal group.

In addition, because the packet receiving and sending characteristic is a characteristic obtained after the plurality of packets received and sent by the target terminal are analyzed, the packet receiving and sending characteristic reflects a correlation between the plurality of packets. Compared with an inherent characteristic such as a MAC address of a terminal, because the inherent characteristic such as the MAC address is usually used to reflect information such as a terminal manufacturer, and the like, a classification standard of dividing terminal types based on the inherent characteristic is relatively rough. However, the packet receiving and sending characteristic can reflect a packet receiving and sending situation of the target terminal. When the terminal types are divided based on the packet receiving and sending characteristic, the classification standard of dividing the terminal types is refined. When the target terminal group to which the target terminal belongs is determined in the plurality of terminal groups based on the packet receiving and sending characteristic, accuracy of determining the target terminal group can be improved, and accuracy of configuring the network device is further improved.

Operation 305: The controller device determines a target configuration corresponding to the target terminal group based on information about the target terminal group.

After obtaining the information about the target terminal group, a second controller device may determine the target configuration corresponding to the target terminal group based on a predetermined correspondence between a terminal group and a configuration.

For example, assuming that the predetermined correspondence between the terminal group and the configuration is that: a terminal 1 corresponds to a configuration 1, a terminal 2 corresponds to a configuration 2, and a terminal 3 corresponds to a configuration 3, and the information that is about the target terminal group and that is obtained by the controller device indicates that the terminal 1 is the target terminal group, the configuration 1 may be determined as the target configuration.

Operation 306: The controller device sends the target configuration to the to-be-configured network device, so that the to-be-configured network device is configured based on the target configuration.

In one embodiment, when the method for configuring the network device provided in this embodiment of the present disclosure is applied to the scenario shown in FIG. 3, an implementation process of the operation 306 may include: sending, by the controller device, the target configuration to the to-be-configured network device, so that a configuration operation is performed on the to-be-configured network device based on the target configuration. When the method for configuring the network device provided in this embodiment of the present disclosure is applied to the scenario shown in FIG. 1, the implementation process of the operation 306 may include: configuring the to-be-configured network device by using the target configuration after the to-be-configured network device determines the target configuration corresponding to the target terminal group. A configuration process of the network device may include: configuring a transmission rate limit, a transmission priority, an access control list, and a VLAN ID added for a packet through the device interface that are of the network device.

Figure 7:
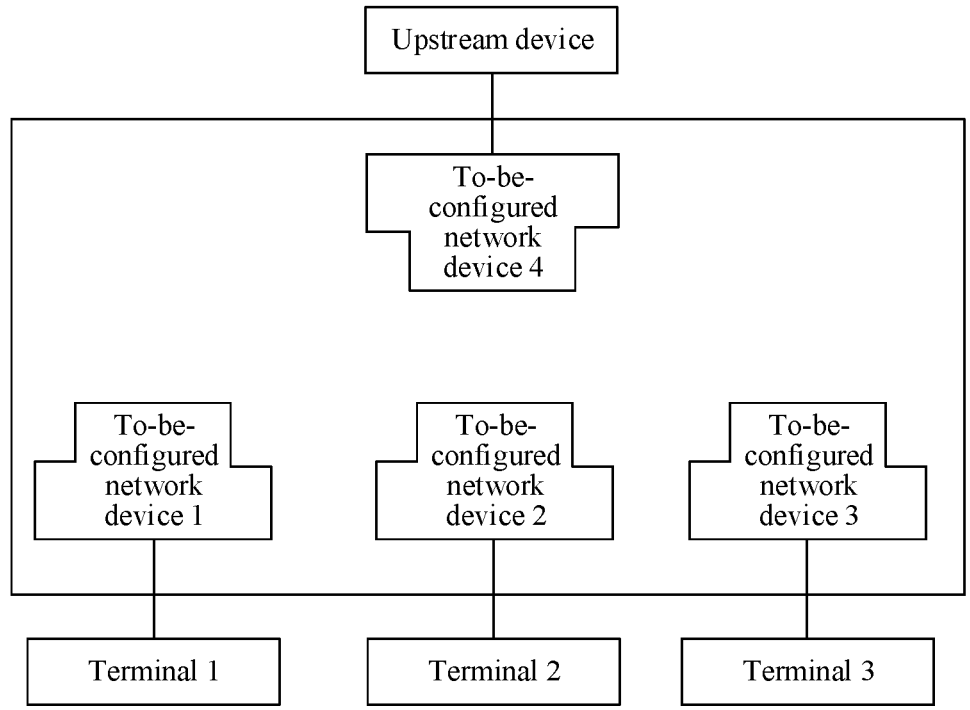
FIG. 7 is a schematic diagram of connecting a to-be-configured network device 1, a to-be-configured network device 2, and a to-be-configured network device 3 to a network through a to-be-configured network device 4 according to this application.

For example, referring to FIG. 7, it is assumed that a to-be-configured network device 1, a to-be-configured network device 2, and a to-be-configured network device 3 are connected to a network through a to-be-configured network device 4, where a terminal 1 is connected to the network through a device interface of the to-be-configured network device 1, a terminal 2 is connected to the network through a device interface of the to-be-configured network device 2, a terminal 3 is connected to the network through a device interface of the to-be-configured network device 3, and the to-be-configured network device 4 is connected to an upstream device (for example, a switch, a router, a firewall, or the like) through a device interface. After the method for configuring the network device provided in this embodiment of the present disclosure is performed on the device interfaces of the to-be-configured network device 1, the to-be-configured network device 2, the to-be-configured network device 3, and the to-be-configured network device 4, configurations of the device interfaces of the to-be-configured network devices are respectively as follows: A VLAN ID added for a packet by the device interface of the to-be-configured network device 1 is 10, an interface type of the device interface is Access, the to-be-configured network device 1 performs authentication based on a protocol 802.1X, and an access control list number of the device interface of the to-be-configured network device 1 is 3000; a VLAN ID added for a packet by the device interface of the to-be-configured network device 2 is 20, and an interface type of the device interface is Access; VLAN IDs added for a packet by the device interface of the to-be-configured network device 3 are 30 and 10, and an interface type of the device interface is Hybird; VLAN IDs added for a packet by the device interface of the to-be-configured network device 4 are 10, 20, and 30, and an interface type of the device interface is Trunk, where Access, Hybird, and Trunk are all common interface types.

Figure 8:
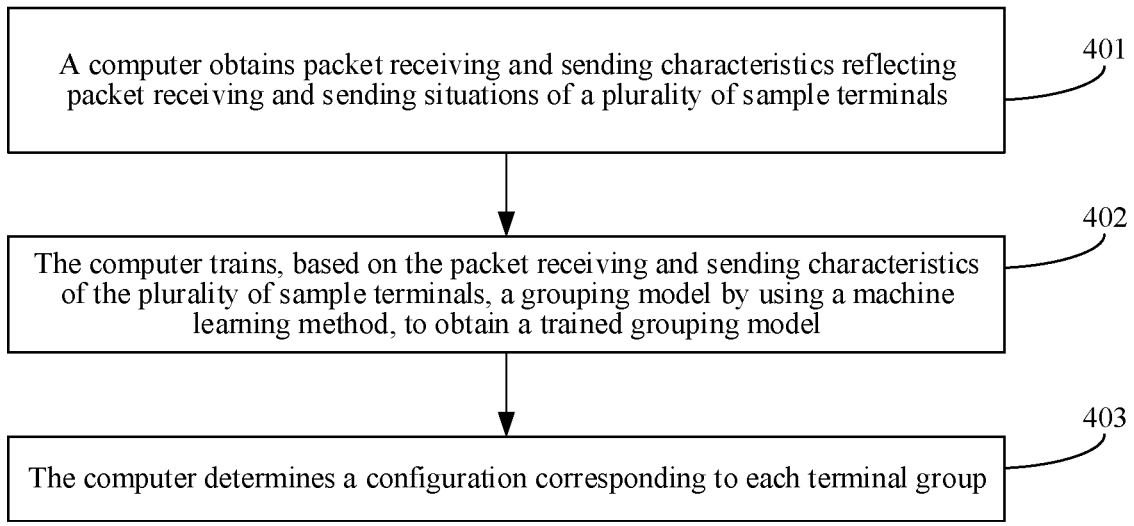
FIG. 8 is a flowchart of a method for training a grouping model based on a training sample, and determining a correspondence between a terminal group and a configuration according to this application.

In one embodiment, before operation 301 to operation 306, the method for configuring the network device may further include a process of training the grouping model based on the training sample and determining the correspondence between the terminal group and the configuration. In one embodiment, the process may be performed in a computer, where the computer may be a machine that has a computing function such as a general-purpose computer, a special-purpose computer, a network device, a server, a personal computer, a router, a mobile terminal, a distributed device, or the like. Referring to FIG. 8, an implementation of the process is as follows.

Operation 401: A computer obtains packet receiving and sending characteristics reflecting packet receiving and sending situations of a plurality of sample terminals.

In one embodiment, there may be a plurality of implementations of the operation 401. For example, in a first feasible implementation, the computer is connected to the plurality of sample terminals, the computer obtains packets received and sent by the plurality of sample terminals, and obtains the packet receiving and sending characteristic based on the received and sent packets. In a second feasible implementation, the plurality of sample terminals are connected to a network device, the network device is connected to the computer, after forwarding, for the sample terminals, packets that need to be received and sent, the network device forwards the packets to the computer, and the computer obtains the packet receiving and sending characteristic based on the packets. Alternatively, after forwarding, for the sample terminals, packets that need to be received and sent, the network device obtains the packet receiving and sending characteristic based on the packets, and sends the packet receiving and sending characteristic to the computer. For a process of obtaining the packet receiving and sending characteristic based on the packets received and sent by the sample terminals, refer to the foregoing operation 302 correspondingly.

Operation 402: The computer trains, based on the packet receiving and sending characteristics of the plurality of sample terminals, a grouping model by using a machine learning method, to obtain a trained grouping model.

Training the group model refers to a process in which a related parameter of the grouping model is adjusted based on an input training sample, to obtain a grouping model having a relatively good classification effect for an input sample, that is, the training process is a process of establishing a mapping relationship between the input sample and the output. In this embodiment of the present disclosure, the process in which the grouping model classifies the input sample may be understood as: a process of determining, based on the mapping relationship between the input sample and the output, a score of a possibility that the terminal corresponding to the packet receiving and sending characteristic belongs to each terminal group in a plurality of terminal groups, and grouping the terminal into a corresponding terminal group based on the score. Correspondingly, after the grouping model is trained, if the packet receiving and sending characteristic reflecting a packet receiving and sending situation of the target terminal is input into the grouping model, the grouping model may determine, based on the established mapping relationship, the score of the possibility that the target terminal belongs to each terminal group. The score corresponding to each terminal group is used to represent a possibility that the target terminal belongs to the corresponding terminal group. In one embodiment, the grouping model used in this embodiment of the present disclosure may be a neural network, a Naive Bayesian model, a k-means clustering model, a fuzzy clustering model, a support vector machine (SVM) model, or the like.

In one embodiment, a training manner of the grouping model may include manners such as supervised learning, unsupervised learning, and semi-supervised learning. The following separately describes training manners of supervised learning and unsupervised learning.

In the training manner of supervised learning, a training sample of an input grouping model includes: the packet receiving and sending characteristics of a plurality of sample terminals and group information (used to identify the terminal group to which each sample terminal belongs) of the plurality of sample terminals. In the training process, the grouping model may generate an output based on an input packet receiving and sending characteristic, determine a deviation between the output and the group information, and further adjust a related parameter in the grouping model based on the deviation. The process is cyclically performed until a deviation between the output generated by the grouping model that adjusts the related parameter and the group information is less than a preset deviation threshold, it is determined that the training of the grouping model is completed. The plurality of sample terminals may be grouped based on a preset grouping condition, to obtain the group information, so that types of a plurality of sample terminals included in the terminal group obtained by grouping are the same. For example, the plurality of sample terminals may be grouped based on a manufacturer, a hardware version number, and a software version number that are of a sample terminal, and a property of a terminal user, to obtain the group information of the plurality of sample terminals.

In the training manner of unsupervised learning, the training sample of the input grouping model includes the packet receiving and sending characteristics of the plurality of sample terminals. In the training process, the grouping model may analyze and compare all input packet receiving and sending characteristics, to obtain differences and similarities embodied by the plurality sample terminals through the packet receiving and sending characteristics, and determine, based on the differences and similarities, a mode baseline for classifying the plurality of sample terminals, to group the plurality of sample terminals into a plurality of terminal groups (that is, output group information). Then, the output group information is compared with the preset group information in a manual confirming manner. When a deviation between the output group information and the preset group information is less than the preset deviation threshold, it is determined to complete the training of the grouping model; and otherwise, the training process continues to be performed until the deviation between the output group information and the preset group information is less than the preset deviation threshold.

Figure 9:
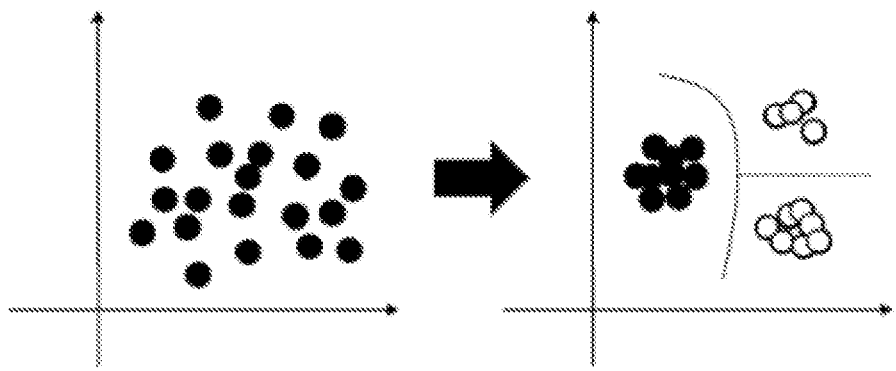
FIG. 9 is a schematic diagram of a principle of determining a mode baseline for classifying a plurality of sample terminals according to this application.

For example, in the training manner of unsupervised learning, for a diagram of a principle of determining a mode baseline for classifying the plurality of sample terminals, refer to FIG. 9. As shown in FIG. 9, after obtaining a packet receiving and sending characteristic of each sample terminal, a computer may input the packet receiving and sending characteristic to a grouping model. The grouping model may use a machine learning method to perform mode analysis on the packet receiving and sending characteristic of each sample terminal, map the packet receiving and sending characteristic of each sample terminal to a mode point (a dot in FIG. 9 represents a mode point) in a multi-dimensional space, and divide a plurality of mode points corresponding to the plurality of sample terminals into a plurality of categories by using a classification algorithm in the machine learning method, where each category includes at least one mode point. That is, the plurality of sample terminals is divided into a plurality of terminal groups. A boundary line dividing the plurality of sample terminals into the plurality of terminal groups is a mode baseline (dashed lines in FIG. 9). FIG. 9 merely shows an example in which a dimension of each mode point is two-dimensional. In an actual application, dimensions of corresponding mode points are different based on different grouping models.

In one embodiment, the process of training the grouping model may be completed in a laboratory, and a packet receiving and sending characteristic of a sample terminal may be obtained by using packet capturing software (software for viewing data packet content transmitted in a network). After the packet receiving and sending characteristic is obtained, the packet receiving and sending characteristic is input into a to-be-trained grouping model, so that the to-be-trained grouping model can be trained. For example, FIG. 10, FIG. 11, and FIG. 12 are respectively packet receiving and sending characteristics that are obtained by the packet capturing software and that reflect packet receiving and sending situations of a sample terminal A, a sample terminal B, and a sample terminal C. First columns from the left to the right in FIG. 10, FIG. 11, and FIG. 12 are sequence numbers of received and sent packets, second columns are MAC addresses of packet transmit ends, third columns are MAC addresses of packet receive ends, fourth columns are packet types, and fifth columns are values of fields in a received and sent packet payload. After packet receiving and sending characteristics of the three sample terminals are input into a grouping model, the grouping model uses a machine learning method to analyze the packet receiving and sending characteristics, to learn that packet receiving and sending situations of the sample terminal A, the sample terminal B, and the sample terminal C have the following rules: The sample terminal A and the sample terminal B send a 60 bit null packet in which a MAC address of the packet receive end is 74:67:f7:12:89:41 approximately at an interval of one to two seconds, and a prefix of the MAC address of the packet transmit end is 40:83:de; and the sample terminal C aperiodically sends a 63 bit packet in which a MAC address of the packet receive end is 84:24:8d: df: ce:44, and a prefix of the MAC address of the packet transmit end is 94:65:2d. After the grouping model performs analysis and comparison based on the packet receiving and sending characteristics, it can be learned that a similarity between packet receiving and sending characteristics of the sample terminal A and the sample terminal B is relatively high, and a similarity between packet receiving and sending characteristics of the sample terminal C and the sample terminal A and a similarity between packet receiving and sending characteristics of the sample terminal C and the sample terminal B are both relatively low. Therefore, the sample terminal A and the sample terminal B are grouped into a same sample terminal group, and the sample terminal C is grouped into another sample terminal group, to obtain the mode baseline for dividing sample terminals, so that the training of the grouping model can be completed.

In operation 401, if the packet receiving and sending characteristic obtained by the computer is the sort of original content of received and sent packets, in an implementation of the operation 402, the grouping model can analyze a plurality of packets based on the original content of the received and sent packets, and obtain differences and similarities embodied by a plurality of sample terminals through packet receiving and sending characteristics, to implement classification of the plurality of sample terminals; if the computer obtains the packet receiving and sending characteristics obtained based on the original content, in another implementation of the operation 402, the grouping model can only analyze a plurality of packets based on the packet receiving and sending characteristics obtained based on the original content, to implement classification of a plurality of sample terminals. Compared with the another implementation, in the implementation of classifying the plurality of sample terminals based on the original content of the received and sent packets, the original content of the received and sent packets provides more information sources for analyzing a plurality of packets, so that differences and similarities of the plurality of sample terminals obtained through analysis are closer to an actual situation, and the plurality of sample terminals can be more accurately classified.

In one embodiment, the packet in operation 401 to operation 402 may be a single packet, or may be a combination of a plurality of packets.

Operation 403: The computer determines a configuration corresponding to each terminal group.

As described above, the computer may be a single device such as a general-purpose computer, a special-purpose computer, a network device, a server, a personal computer, a router or a mobile terminal, or may be a distributed device, or the like. For example, when the computer is a distributed device, a function of the computer may be implemented through a network controller and a network analyzer, where the network analyzer may be configured to perform operation 401 and operation 402, and the network controller is configured to perform operation 403. In addition, the network analyzer and the network controller may both be an independent device, or may be components integrated in a device such as a network device, a server, or the like. When the computer is respectively a single device and a distributed device, implementations of the operation 403 are different, and the following describes two implementations.

When the computer is a single device, operation 402 and operation 403 are both performed by the computer, the computer may receive a first configuration instruction, the first configuration instruction is used to indicate a configuration corresponding to each terminal group in the group information, and the computer may determine the configuration corresponding to each terminal group based on the first configuration instruction and the group information obtained in operation 402.

When the computer is a distributed device, an example in which a function of a computer device is implemented through a network controller and a network analyzer, the network analyzer is configured to perform operation 402, and the network controller is configured to perform operation 403 is used to describe an implementation thereof. In the implementation of the operation 403, the network controller may receive the group information and the first configuration instruction, the group information is used to indicate a terminal group to which each sample terminal belongs, the first configuration instruction is used to indicate the configuration corresponding to each terminal group in the group information, and under the indication of the group information and the first configuration instruction, the network controller may establish a one-to-one correspondence between the terminal group and the configuration, that is, determine the configuration corresponding to each terminal group.

In one embodiment, the correspondence that is recorded in the first configuration instruction and that is between the configuration and the terminal group may be implemented in a pre-determining manner and a post-determining manner. The two implementations are described below.

In the pre-determining implementation, before a plurality of sample terminals are grouped (that is, before the group information is determined), configurations corresponding to all or some of the plurality of sample terminals are respectively determined. After sample terminals are grouped, if configurations of all sample terminals in the terminal group are known, a correspondence between the configuration and the terminal group can be directly obtained; after the sample terminals are grouped, if only configurations of some of sample terminals in the terminal group are known, a known configuration corresponding to a sample terminal may be determined as a configuration corresponding to a terminal group to which the sample terminal belongs, to obtain the correspondence between the configuration and the terminal group.

In the post-determining implementation, after a plurality of sample terminals are grouped (that is, after the group information is determined), at least one sample terminal is selected from each terminal group, a configuration corresponding to the selected at least one sample terminal is determined, and then the determined configuration is determined as a configuration corresponding to a corresponding terminal group. At least one sample terminal may be selected from each terminal group randomly or based on an actual requirement.

In the two implementations, actions of determining the configuration corresponding to the sample terminal may be performed manually. In addition, an action of determining the known configuration corresponding to the sample terminal as the configuration corresponding to the terminal group to which the sample terminal belongs may be performed manually or performed through the network controller. For example, the first configuration instruction may only record the correspondence between the selected sample terminal and the configuration, and after receiving the first configuration instruction, the network controller may determine configuration information corresponding to the selected sample terminal as a configuration corresponding to a terminal group to which the sample terminal belongs, and then establish a one-to-one correspondence between the terminal group and the configuration.

In this embodiment of the present disclosure, a global setting of the network device may be configured, to perform, based on a configured network device, a specified processing operation on all packets forwarded by the network device. Alternatively, a local setting of the network device may be configured, to perform, based on a configured network device, a specified processing operation on some of packets forwarded by the network device. For example, a device interface of the network device is configured, and a VLAN ID is added, through the device interface, for packets forwarded by the device interface. A plurality of packets received and sent in the foregoing operation 301 and operation 401 may be packets received and sent by one or more terminals. When a global configuration of the network device is set, the one or more terminals are terminals connected to the network device, and when a local configuration of the network device is set, the local part that needs to be configured is a part that affects the packets received and sent by the one or more terminals, for example, the local part that needs to be configured may be a specified device interface of the network device.

The foregoing operation 401 to operation 403 are processes of obtaining the training sample, training the grouping model based on the training sample, and establishing the correspondence between the terminal group and the configuration. When the configuration corresponding to the target terminal is determined, operation 401 to operation 403 do not need to be performed each time. That is, when the configuration corresponding to the target terminal is determined, the target terminal group corresponding to the target terminal can be determined directly by using the trained grouping model and established correspondences.

The method for configuring the network device provided in this embodiment of the present disclosure may not only be applied to an application scenario of training models based on packet receiving and sending characteristics reflecting that a sample terminal receives and sends packets, determining, based on a trained model, a target terminal group to which a target terminal belongs, and then configuring the network device based on a configuration corresponding to the target terminal group, but also may be applied to other scenarios of obtaining characteristics, performing grouping based on the characteristics, and determining corresponding information based on a grouping result, so that flexibility of the configuration method is improved. For example, the method may further be applied to a scenario of changing a configuration of the network device based on a network use context, where the network use context may include: network use contexts of a working time period and an off-working time period, a network use context after a terminal gets a virus, or a network use context in a screen-locked time, so that the terminal can flexibly change the configuration in a process of accessing a network. Alternatively, the method for configuring the network device may further be applied to the Internet of Things, for example, a router may be configured based on information sent by a sensor in the Internet of Things.

According to the method for configuring the network device provided in this embodiment of the present disclosure, the target terminal is classified based on the packet receiving and sending characteristic reflecting a packet receiving and sending situation of the target terminal, and the to-be-configured network device is configured based on a classification result. Compared with an implementation in which the network device is configured manually, the target configuration of the target terminal can be determined based on the packet receiving and sending characteristic of the target terminal without manually determining the target configuration of the network device based on the target terminal, thereby effectively reducing workload in the configuration process.

In addition, because the packet receiving and sending characteristic is a characteristic obtained after the plurality of packets received and sent by the target terminal are analyzed, the packet receiving and sending characteristic reflects a correlation between the plurality of packets. Compared with an inherent characteristic such as a MAC address of a terminal, because the inherent characteristic such as the MAC address is usually used to reflect information such as a terminal manufacturer, and the like, a classification standard of dividing terminal types based on the inherent characteristic is relatively rough. However, the packet receiving and sending characteristic can reflect a packet receiving and sending situation of the target terminal, when the terminal types are divided based on the packet receiving and sending characteristic, the classification standard of dividing the terminal types is refined. When the target terminal group to which the target terminal belongs is determined in the plurality of terminal groups based on the packet receiving and sending characteristic, accuracy of determining the target terminal group can be improved, and accuracy of configuring the network device is further improved.

Further, compared with a related technology in which a user account and a password are sent to a server by using a terminal, to perform authentication to obtain a configuration, the user account and the password do not need to be sent each time the network device is configured, thereby improving flexibility of obtaining a configuration. At the same time, a correspondence between the user account and password and the configuration corresponding to the terminal does not need to be collected and maintained in advance, thereby reducing workload in the configuration process.

An order of the operations of the method for configuring the network device provided in this embodiment of the present disclosure may be properly adjusted, and operations may also be correspondingly added and reduced based on situations. Any varied method readily figured out by a person skilled in the art within the technical scope disclosed in the present disclosure shall fall within the protection scope of the present disclosure, and therefore, details are not described herein again.

The following describes apparatus embodiments of this application, and the apparatus embodiments may be used to perform the method embodiments of this application. For details not disclosed in the apparatus embodiments of this application, refer to the method embodiments of this application.

Figure 13:
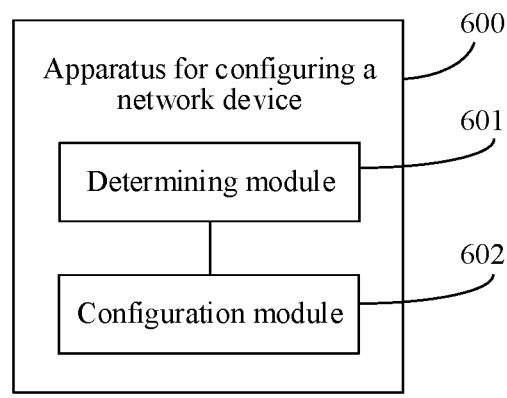
FIG. 13 is a block diagram of an apparatus for configuring a network device according to this application.

FIG. 13 is a block diagram of an apparatus for configuring a network device according to an embodiment of the present disclosure. As shown in FIG. 13, the apparatus 600 for configuring the network device may include:

a determining module 601, configured to determine, in a plurality of terminal groups based on a packet receiving and sending characteristic of a test terminal, a target terminal group to which the test terminal belongs, where the packet receiving and sending characteristic is determined based on a plurality of packets received and sent by the test terminal, and the plurality of terminal groups are in a one-to-one correspondence with a plurality of configurations; and a configuration module 602, configured to configure a to-be-configured network device based on a target configuration corresponding to the target terminal group, where the to-be-configured network device is a network device that forwards the plurality of packets.

In one embodiment, the packet receiving and sending characteristic includes sort of the plurality of packets.

In one embodiment, the packet receiving and sending characteristic further includes the following one or more: a packet transmission time interval between two packets in the plurality of packets, sort of packet types of the plurality of packets, and sort of packet sizes of the plurality of packets.

Figure 14:
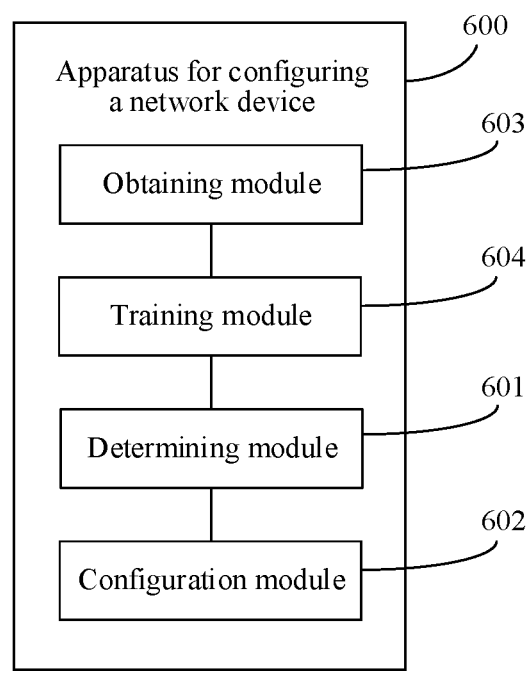
FIG. 14 is a block diagram of another apparatus for configuring a network device according to this application.

In one embodiment, as shown in FIG. 14, the apparatus 600 may further include:

an obtaining module 603, configured to obtain packet receiving and sending characteristics of a plurality of sample terminals; and a training module 604, configured to train, based on the packet receiving and sending characteristics of the plurality of sample terminals, a grouping model by using a machine learning method, to obtain a trained grouping model.

In one embodiment, the determining module 601 is configured to: separately determine, in the plurality of terminal groups based on the trained grouping model and the packet receiving and sending characteristic, a score of a possibility that the test terminal belongs to each terminal group, where the grouping model is used to separately determine, based on an input packet receiving and sending characteristic, the score of the possibility that the target terminal belongs to each terminal group, and the score corresponding to each terminal group is used to represent a possibility that the target terminal belongs to a corresponding terminal group; determine a highest score in the scores of the possibilities that the test terminal belongs to the terminal groups; and determine that a terminal group corresponding to the highest score is the target terminal group.

Above all, the apparatus for configuring the network device provided in this embodiment of the present disclosure classifies the target terminal through the determining module based on the packet receiving and sending characteristic reflecting the packet receiving and sending situation of the target terminal, and the configuration module configures the to-be-configured network device based on a classification result. Compared with an implementation in which the network device is configured manually, the target configuration of the target terminal can be determined based on the packet receiving and sending characteristic of the target terminal without manually determining the target configuration of the network device based on the target terminal, thereby effectively reducing workload in the configuration process.

It may be clearly understood by a person skilled in the art that, for the purpose of convenient and brief description, for a detailed working process of the foregoing apparatus and modules, refer to a corresponding process in the foregoing method embodiments, and details are not described herein again.

An embodiment of the present disclosure further provides an apparatus for configuring a network device, and the apparatus for configuring the network device may include: a processor; and a memory, configured to store an executable instruction of the processor, where the processor is configured to: determine in a plurality of terminal groups based on a packet receiving and sending characteristic of a target terminal, a target terminal group to which the target terminal belongs, where the packet receiving and sending characteristic is determined based on a plurality of packets received and sent by the target terminal, and the plurality of terminal groups are in a one-to-one correspondence with a plurality of configurations; and configure a to-be-configured network device based on a target configuration corresponding to the target terminal group, where the to-be-configured network device is a network device that forwards the plurality of packets.

Figure 15:
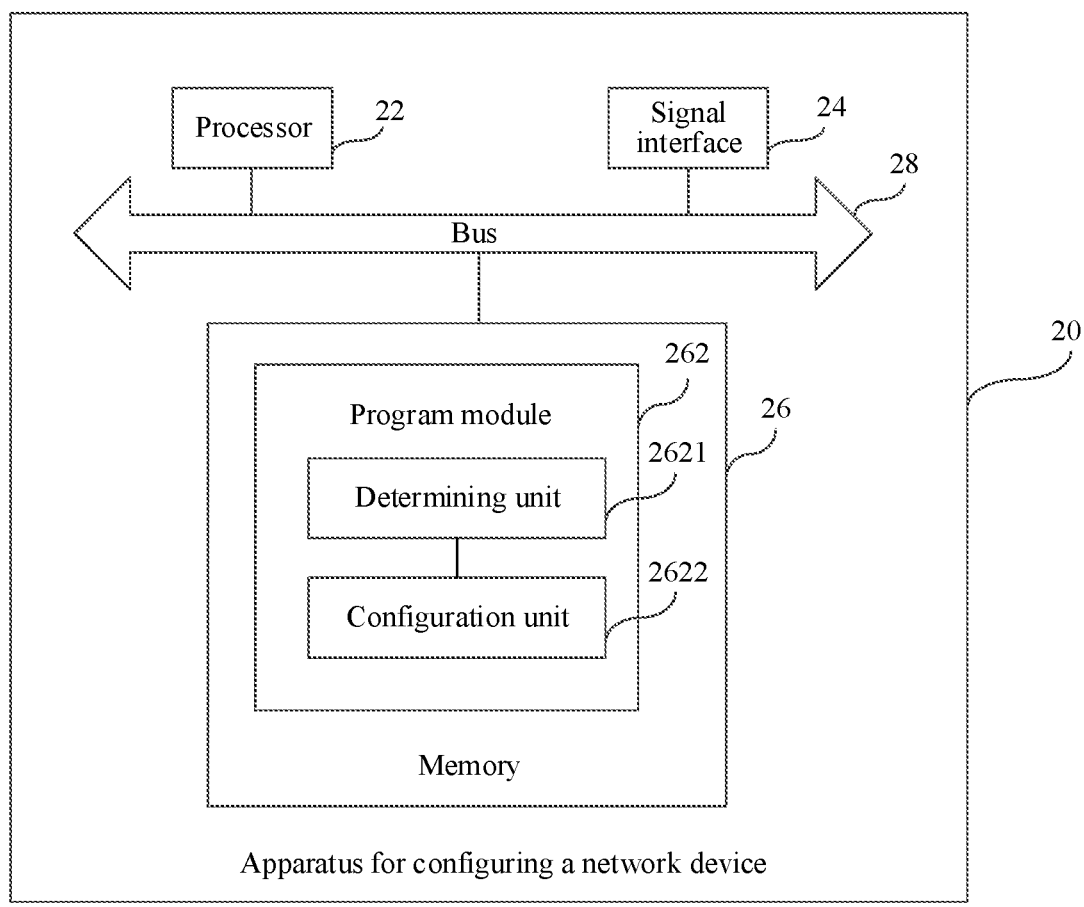
FIG. 15 is a schematic structural diagram of an apparatus for configuring a network device according to this application.

Specifically, referring to FIG. 15, an embodiment of the present disclosure further provides an apparatus 20 for configuring a network device. As shown in FIG. 15, the apparatus 20 for configuring the network device may include a processor 22 and a signal interface 24.

The processor 22 includes one or more processing cores. By running a software program and module, the processor 22 performs various functional applications and data processing. The processor 22 may include one or more of a central processing unit, a digital signal processor, a microprocessor, a micro controller, or an artificial intelligence processor, or may further selectively include a hardware accelerator required for performing computation, for example, various logical operation circuits.

There may be a plurality of signal interfaces 24, and the signal interface 24 is configured to establish a connection to another apparatus or module. For example, a transceiver may be connected by using the signal interface 24. Therefore, in one embodiment, the apparatus 20 may further include a transceiver (not shown in the figure). The transceiver specifically performs signal receiving and sending. When needing to perform the signal receiving and sending operation, the processor 22 may invoke or drive the transceiver to perform a corresponding receiving and sending operation. Therefore, when the apparatus 20 performs signal receiving and sending, the processor 22 is configured to decide or initiate a receiving and sending operation and is equivalent to an initiator. The transceiver is configured to perform specific receiving and sending and is equivalent to an executor. The transceiver may further be a transceiver circuit, a radio frequency circuit, or a radio frequency unit. This is not limited in this embodiment.

In one embodiment, the apparatus 20 for configuring the network device further includes components such as a memory 26, a bus 28, and the like. The memory 26 and the signal interface 24 are separately connected to the processor 22 through the bus 28.

The memory 26 may be configured to store a software program and a module. Specifically, the memory 26 may store a program module 262 required by at least one function, and the program may be an application or a driver.

The program module 262 may include:

a determining unit 2621, having a function the same as or similar to that of the determining module 601; and a configuration unit 2622, having a function the same as or similar to that of the configuration module 602.

An embodiment of the present disclosure further provides a storage medium. The storage medium may be a non-volatility computer-readable storage medium. When an instruction in the storage medium is executed by a processor of a terminal, the terminal is enabled to perform the method for configuring the network device according to embodiments of the present disclosure.

An embodiment of the present disclosure further provides a computer program product including an instruction. When run on a computer, the computer program product enables the computer to perform the method for configuring the network device according to embodiments of the present disclosure.

A person of ordinary skill in the art may understand that all or some of operations of the embodiments may be implemented by hardware or a program instructing related hardware. The program may be stored in a computer-readable storage medium. The foregoing storage medium may be a read-only memory, a magnetic disk, an optical disc, or the like.

The foregoing descriptions are merely examples of the embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for configuring a network device, comprising:

separately determining, in a plurality of terminal groups based on a trained grouping model and a packet receiving and sending characteristic of a target terminal, a plurality of scores of possibilities that a target terminal group belongs to the plurality of terminal groups, wherein the packet receiving and sending characteristic is determined based on a plurality of packets received and sent by the target terminal, and the plurality of terminal groups are in a one-to-one correspondence with a plurality of configurations, wherein the packet receiving and sending characteristic comprises a packet transmission time interval between two packets in the plurality of packets, wherein the grouping model is used to separately determine, based on an input packet receiving and sending characteristic, the score of the possibility that the target terminal belongs to each terminal group;

determining that a terminal group corresponding to a score of the plurality of scores of possibilities is the target terminal group; and configuring a network device to be configured based on a target configuration corresponding to the target terminal group, wherein the network device is to forward the plurality of packets.

2. The method according to claim 1, wherein the packet receiving and sending characteristic comprises a sort of the plurality of packets.

3. The method according to claim 1, wherein the packet receiving and sending characteristic further comprises at least one of a packet transmission time interval between two packets in the plurality of packets, a sort of packet types of the plurality of packets, a sort of packet sizes of the plurality of packets, or a sort of original content of the plurality of packets.

4. The method according to claim 1, further comprising:

obtaining packet receiving and sending characteristics of a plurality of sample terminals; and training, based on the packet receiving and sending characteristics of the plurality of sample terminals, a grouping model by using a machine learning method, to obtain a trained grouping model.

5. The method according to claim 4, wherein the determining, in the plurality of terminal groups based on the packet receiving and sending characteristic of a target terminal, the target terminal group to which the target terminal belongs comprises:

wherein each of the scores of the possibilities corresponds to the score of the possibility that the target terminal belongs to each terminal group;

determining a highest score of the possibility in the plurality of scores of the possibilities that the target terminal belongs to the terminal groups; and determining that a terminal group corresponding to the highest score of the possibility is the target terminal group.

6. An apparatus for configuring a network device, the apparatus for configuring the network device comprising:

a processor; and a memory configured to store an executable instruction of the processor, wherein the processor is configured to:

separately determine, in a plurality of terminal groups based on a trained grouping model and a packet receiving and sending characteristic of a target terminal, a plurality of scores of possibilities that a target terminal group belongs to the plurality of terminal groups, wherein the packet receiving and sending characteristic is determined based on a plurality of packets received and sent by the target terminal, and the plurality of terminal groups are in a one-to-one correspondence with a plurality of configurations, wherein the grouping model is used to separately determine, based on an input packet receiving and sending characteristic, the score of the possibility that the target terminal belongs to each terminal group;

determine that a terminal group corresponding to a score of the plurality of scores of possibilities is the target terminal group; and configure a network device to be configured based on a target configuration corresponding to the target terminal group, wherein the network device is to forward the plurality of packets.

7. The apparatus according to claim 6, wherein the packet receiving and sending characteristic comprises a sort of the plurality of packets.

8. The apparatus according to claim 6, wherein the packet receiving and sending characteristic further comprises at least one of a packet transmission time interval between two packets in the plurality of packets, a sort of packet types of the plurality of packets, a sort of packet sizes of the plurality of packets, or a sort of original content of the plurality of packets.

9. The apparatus according to claim 6, wherein the processor is further configured to:
 obtain packet receiving and sending characteristics of a plurality of sample terminals; and
 train, based on the packet receiving and sending characteristics of the plurality of sample terminals, a grouping model by using a machine learning method, to obtain a trained grouping model.

10. The apparatus according to claim 9, wherein the processor is further configured to:
 wherein each of the scores of the possibilities corresponds to the score of the possibility that the target terminal belongs to each terminal group;
 determine a highest score of the possibility in the plurality of scores of the possibilities that the target terminal belongs to the terminal groups; and
 determine that a terminal group corresponding to the highest score of the possibility is the target terminal group.

11. A non-transitory machine-readable storage medium having instructions stored therein, which when executed by a processor, cause the processor to perform operations, the operations comprising:
 separately determining, in a plurality of terminal groups based on a trained grouping model and a packet receiving and sending characteristic of a target terminal, a plurality of scores of possibilities that a target terminal group belongs to the plurality of terminal groups, wherein the packet receiving and sending characteristic is determined based on a plurality of packets received and sent by the target terminal, and the plurality of terminal groups are in a one-to-one correspondence with a plurality of configurations, wherein the grouping model is used to separately determine, based on an input packet receiving and sending characteristic, the score of the possibility that the target terminal belongs to each terminal group;
 determining that a terminal group corresponding to a score of the plurality of scores of possibilities is the target terminal group; and
 configuring a network device to be configured based on a target configuration corresponding to the target terminal group, wherein the network device is to forward the plurality of packets.

12. The storage medium according to claim 11, wherein the packet receiving and sending characteristic comprises a sort of the plurality of packets.

13. The storage medium according to claim 11, wherein the packet receiving and sending characteristic further comprises at least one of a packet transmission time interval between two packets in the plurality of packets, a sort of packet types of the plurality of packets, a sort of packet sizes of the plurality of packets, or a sort of original content of the plurality of packets.

14. The storage medium according to claim 11, wherein the operations further comprise:
 obtaining packet receiving and sending characteristics of a plurality of sample terminals; and
 training, based on the packet receiving and sending characteristics of the plurality of sample terminals, a grouping model by using a machine learning method, to obtain a trained grouping model.

15. The storage medium according to claim 14, wherein the operations further comprise:
 determining a highest score of the possibility in the plurality of scores of the possibilities that the target terminal belongs to the terminal groups; and
 determining that a terminal group corresponding to the highest score of the possibility is the target terminal group.

16. The method according to claim 1, wherein the packet receiving and sending characteristic reflects a correlation between the plurality of packets.

17. The apparatus according to claim 6, wherein the packet receiving and sending characteristic reflects a correlation between the plurality of packets.

18. The storage medium according to claim 11, wherein the packet receiving and sending characteristic reflects a correlation between the plurality of packets.

* * * * *